UNITED STATES PATENT OFFICE.

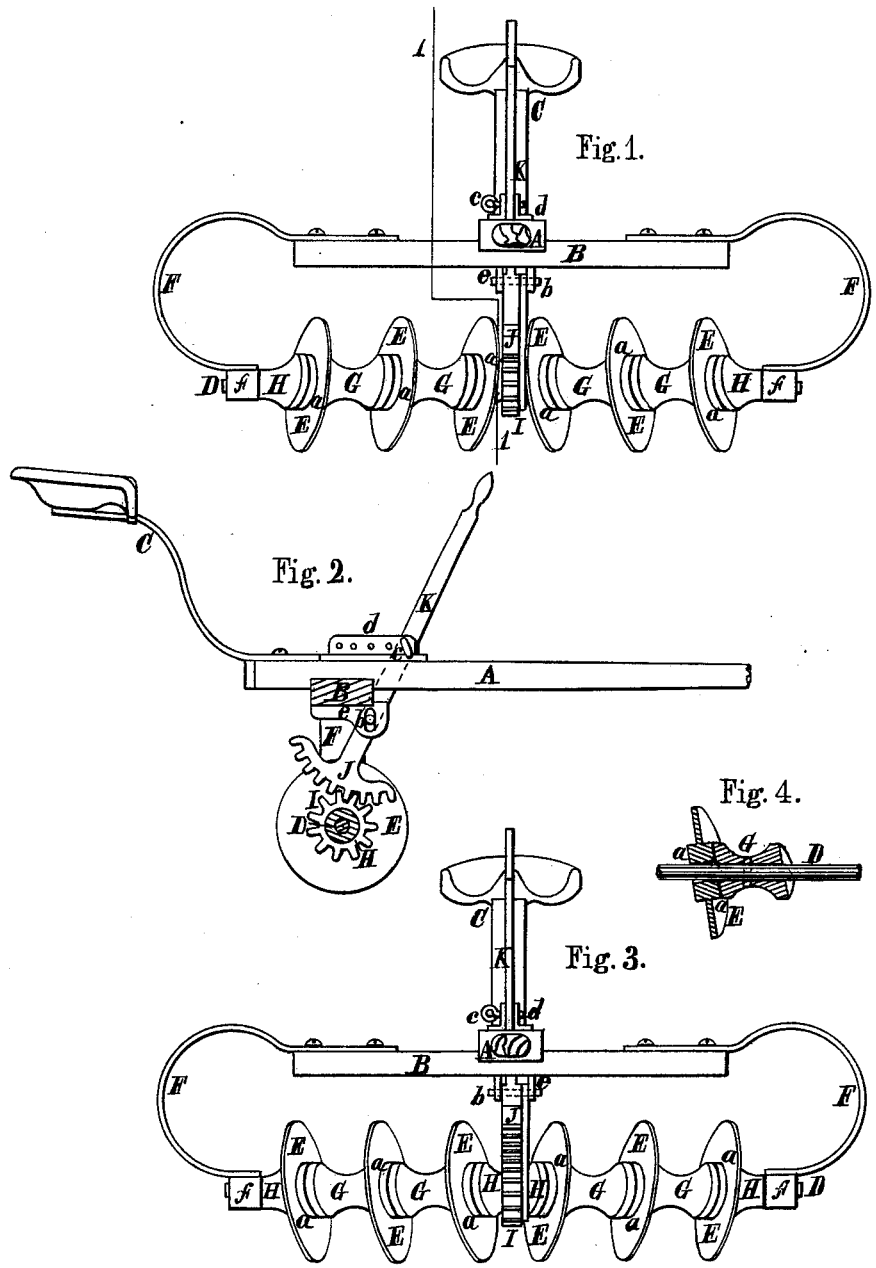

HENRY F. SHAW, OF BOSTON, AND GEORGE F. SHAW, OF DEDHAM, MASS.

IMPROVEMENT IN WHEEL-HARROWS.

Specification forming part of Letters Patent No. 220,255, dated October 7, 1879; application filed June 9, 1879.

*To all whom it may concern:*

Be it known that we, HENRY F. SHAW, of Boston, in the county of Suffolk, and State of Massachusetts, and GEORGE F. SHAW, of Dedham, in the county of Norfolk and State of Massachusetts, have invented a new and useful Improvement in Wheel-Harrows, which improvement is fully set forth in the following specification, reference being had to the accompanying drawings.

Our invention relates to that class of harrows in which disks, plates, or wheels are employed to stir or turn the soil; and it consists, first, in placing the disks or wheels on one straight shaft, and at such angles thereto that they may be set to partially raise the soil, and may be adjusted to throw the soil on both sides of the central line of draft inward toward or outward from the said central line; secondly, in fixing said single shaft, having the disks or wheels arranged thereon in the manner above named, at right angles to the pole or line of draft; thirdly, in the method and mechanism hereinafter described for changing position of or reversing said disks or wheels; fourthly, in the intervention of springs between the shaft bearing the disks and the frame-work of the harrow.

In the drawings, Figure 1 is a front view of a wheel-harrow embodying our invention. Fig. 2 shows a section on and parts beyond to the right of line 1 1, in Fig. 1. Fig. 3 is a front view of the harrow, the angular position of the disks on the shaft being changed or reversed from that shown in Fig. 1. Fig. 4 is a vertical section through a disk and collar, showing the form of the bearing of a disk and the relation of a collar thereto.

A is the pole, and B a cross-bar. These, together with the seat and support C, form the main frame-work of the harrow.

D is the shaft, on which are the disks, plates, or wheels E. Two springs, F, connect the shaft D with the cross-bar B, as shown.

Each disk E is of increased thickness toward the center, or has a flange, *a*, joined thereto on each side, forming a hub. Through the center of disk and flanges or hub is an opening for the shaft D, which is at the center about the size of the shaft, but is beveled outward toward either side, so that the disk may be set at an angle with the shaft other than a right angle and have a bearing on the shaft, as shown in Fig. 4.

Collars G are placed between the disks, and collars H outside each set of disks, to keep the disks in position and at the desired angle in reference to the shaft. This angle has reference both to a horizontal and vertical plane when the disks are in position shown either in Fig. 1 or Fig. 3—that is, the disks are in position to slightly raise up, and hence tend to turn the soil over, as well as to move it to one side or the other. As shown in Fig. 1, the disks are set to throw the dirt outward from the central line of draft, and as shown in Fig. 3, inward toward said line.

The shaft D has a groove therein, and the collars G a spline or pin, so that these collars and the disks may be slid endwise on the shaft in their order, and the collars be held from turning independently of the shaft, while the disks may revolve on the shaft.

The outer collars, H, may be fastened firmly to the shaft, either by pins or otherwise, to hold the collars G and disks E on the shaft.

Fixed on the shaft D, at or near the center, is a gear, I. To mesh into this gear is a portion of a gear, J, which is pivoted at *b*, and has fixed to it a handle or lever, K. This handle, and hence the gears I and J, may be kept in any desired position by a pin, *c*, thrust through a hole in the plates *d* and through or by the side of the handle. The pivot-pin *b* is in a slot in stand *e*, connected to the pole or cross-bar, to allow for the motion arising from the action of the springs F.

We design to place the disks E on the shaft D, so that one-half of them will be pressed endwise in working in the opposite direction from the other half, as shown in Fig. 1 or Fig. 3. Thus the thrust endwise of the shaft will be counterbalanced, and will not come on its bearings *f*.

The disks may be caused to take the position shown in Fig. 1 or Fig. 3—that is, to throw the soil outward or inward—by means of the lever K and gears I and J. This reversing may be done mainly by the team, either in motion forward or by backing, since by rolling the disks the change of position on the shaft is assisted.

Many practical advantages arise from the general plan and design of our harrow.

The details of construction may be varied, as will readily be seen, without destroying the essential features of our invention.

The harrow is simple and compact, requiring but one straight shaft for the disks and few parts for the frame-work. The springs adapt it to the unevenness of the ground, and add to the ease of operation and comfort of the operator.

The soil may be thrown outward or inward, at the will of the operator.

We claim as our invention—

1. A harrow having all the disks or wheels arranged on one straight shaft on both sides of the central line of draft, and at an inclination to said shaft, as described, so as to partially raise the soil, and adjustable, so that they may throw the soil, with one adjustment, toward said central line, or, with another adjustment, outward from said line, substantially as hereinbefore set forth.

2. In a harrow, a straight shaft having thereon disks or wheels on both sides of the central line of draft, placed at the angles therewith specified, and made adjustable, as and for the purpose specified, when said shaft is arranged at right angles to the pole or central line of draft, substantially as hereinbefore set forth.

3. The combination of the one straight shaft D, having the wheels or disks E and collars G and H arranged thereon, as specified, portion of gear J, gear I, and lever K, substantially as hereinbefore described.

4. In a wheel-harrow, springs F, intervening between the shaft D and cross-bar B, substantially as hereinbefore set forth.

HENRY F. SHAW.
GEORGE F. SHAW.

Witnesses:
  EDW. DUMMER,
  HARRY VAN DUZEE.